United States Patent
Bell et al.

(10) Patent No.: US 7,519,850 B2
(45) Date of Patent: *Apr. 14, 2009

(54) METHOD AND UNIT FOR BUFFER CONTROL

(75) Inventors: Debra M. Bell, Boise, ID (US); Aaron M. Schoenfeld, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 140 days.

This patent is subject to a terminal disclaimer.

(21) Appl. No.: 11/458,366

(22) Filed: Jul. 18, 2006

(65) Prior Publication Data
US 2006/0244491 A1    Nov. 2, 2006

Related U.S. Application Data

(63) Continuation of application No. 10/179,445, filed on Jun. 25, 2002, now Pat. No. 7,155,630.

(51) Int. Cl.
G06F 1/04 (2006.01)
G06F 1/00 (2006.01)
G06F 1/32 (2006.01)
(52) U.S. Cl. ............ 713/600; 713/300; 713/320
(58) Field of Classification Search ............ 713/600, 713/300, 320
See application file for complete search history.

(56) References Cited

U.S. PATENT DOCUMENTS

| | | |
|---|---|---|
| 3,794,766 A | 2/1974 | Cox et al. |
| 5,087,842 A | 2/1992 | Pulsipher et al. |
| 5,453,708 A | 9/1995 | Gupta et al. |
| 5,463,340 A | 10/1995 | Takabatake et al. |
| 5,710,934 A | 1/1998 | Bona et al. |
| 5,801,554 A | 9/1998 | Momma et al. |
| 5,880,998 A | 3/1999 | Tanimura et al. |
| 5,903,508 A | 5/1999 | Choi |
| 5,905,393 A | 5/1999 | Rinderknecht et al. |
| 6,037,816 A | 3/2000 | Yamauchi |
| 6,097,230 A | 8/2000 | Bareither |
| 6,194,937 B1 | 2/2001 | Minami |
| 6,282,132 B1 | 8/2001 | Brown et al. |

(Continued)

OTHER PUBLICATIONS

PABST, T., "DDR-SDRAM Has Finally Arrived", *Tom's Hardware Guide*, http://www.tomshardware.com/motherboard/20001030/, (Oct. 30, 2000).

*Primary Examiner*—Thomas Lee
*Assistant Examiner*—Ji H Bae
(74) *Attorney, Agent, or Firm*—Schwegman, Lundberg & Woessner, P.A.

(57) ABSTRACT

A system unit including a processor unit and an input storage unit. The processor unit generates an input signal and a clock signal. The input storage unit receives the input signal and the clock signal. The input storage unit processes the clock signal to generate an input buffer enable signal. The input buffer enable signal changes from an inactive state to an active state a short time interval before at least one of the transitions of the clock signal. A method includes receiving a clock signal having a plurality of transitions at an input buffer unit, enabling the input buffer unit before each of the plurality of transitions, and disabling the input buffer unit after each of the plurality of transitions.

49 Claims, 12 Drawing Sheets

U.S. PATENT DOCUMENTS

| | | |
|---|---|---|
| 6,333,660 B2 | 12/2001 | Taguchi et al. |
| 6,339,353 B1 | 1/2002 | Tomita et al. |
| 6,519,188 B2 | 2/2003 | Ryoo et al. |
| 6,605,969 B2 | 8/2003 | Mikhalev et al. |
| 6,661,717 B1 | 12/2003 | Gomm et al. |
| 6,693,472 B2 | 2/2004 | Mikhalev et al. |
| 6,798,711 B2 | 9/2004 | Bell |
| 6,801,061 B2 | 10/2004 | Cowles |
| 6,816,994 B2 | 11/2004 | Schoenfeld et al. |
| 6,898,683 B2 | 5/2005 | Nakamura |
| 6,975,149 B2 | 12/2005 | Mikhalev et al. |
| 7,155,630 B2 | 12/2006 | Bell et al. |

METHOD AND UNIT FOR BUFFER CONTROL

RELATED APPLICATIONS

This application is a Continuation of U.S. application Ser. No. 10/179,445, filed on Jun. 25, 2002, now U.S. Pat. No. 7,155,630 which is incorporated herein by reference.

FIELD OF THE INVENTION

The present invention relates to controlling power consumption in electronic systems and, more particularly, to controlling power consumption in input buffers in electronic systems.

BACKGROUND OF THE INVENTION

Electronic systems, such as computers, consume power during operation. Power is expensive. For a large electronic system, such as a computer server, the yearly operating cost can exceed the purchase price of the system. For a small battery powered electronic system, such as a personal digital assistant or notebook computer, the effective operating time between battery replacement or recharge is on the order of a few hours. Purchasers of large electronic systems prefer systems that are inexpensive to operate, while purchasers of small battery powered electronic systems prefer systems that have a long battery life.

Designers of electronic systems attempt to reduce the operating costs of large systems and to increase the battery life of small systems by designing circuits, such as input buffers, that operate at low voltage levels. Unfortunately, as the operating voltage levels are reduced in an electronic system, the noise margins are also reduced. Circuits operating with reduced noise margins tend to have high error rates. Thus, the problems associated with high error rates must be solved each time operating voltage levels are reduced. The problems associated with high error rates are difficult to solve and often require reducing the bandwidth of a system.

More significantly, even after system operating voltage levels are reduced, many input buffers, such as input buffers found in memory circuits, continue to consume inordinate amounts of power. Input buffers are loaded at system clock transition times, and even though each clock transition occurs over only a small portion of a clock cycle, input buffers are enabled and draw current during the entire clock cycle. So, input buffers consume power during the entire clock cycle.

For these and other reasons there is a need for the present invention.

DETAILED DESCRIPTION

In the following detailed description of the preferred embodiments, reference is made to the accompanying drawings which form a part hereof, and in which is shown by way of illustration specific preferred embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present inventions. The following detailed description is, therefore, not to be taken in a limiting sense, and the scope of the present invention is defined only by the appended claims.

Figure 1A:
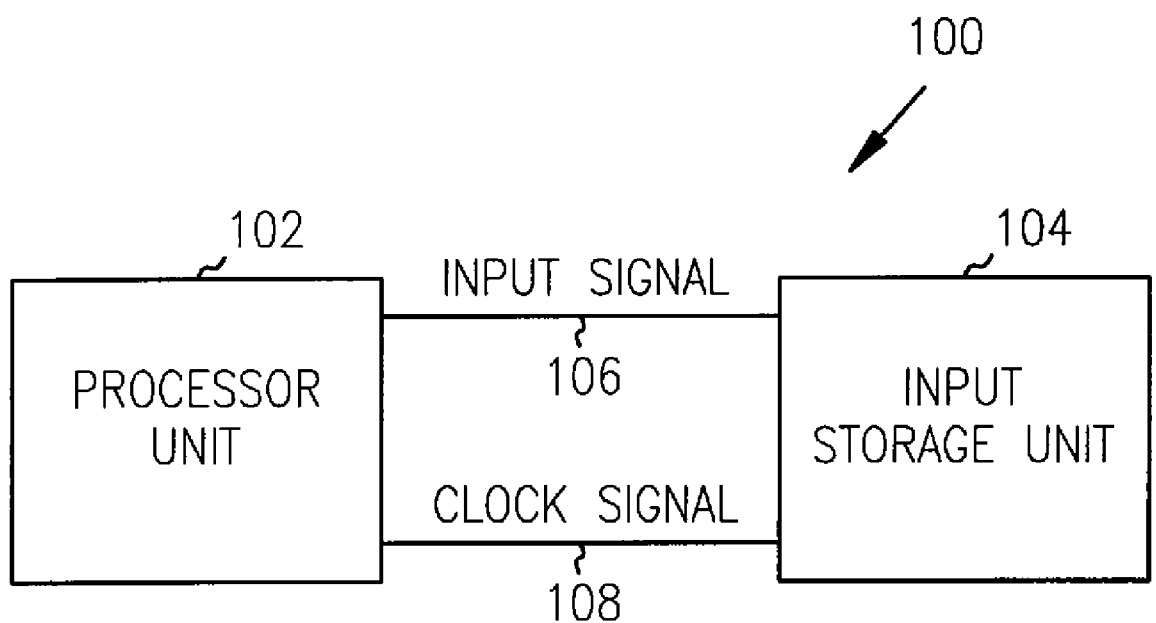
FIG. 1A shows a block diagram of one embodiment of a system unit including a processor unit coupled to an input storage unit according to the teachings of the present invention.

FIG. 1A shows a block diagram of one embodiment of a system unit 100 including a processor unit 102 coupled to an input storage unit 104 according to the teachings of the present invention. In operation, the processor unit 102 provides an INPUT SIGNAL 106 and a CLOCK SIGNAL 108 to the input storage unit 104.

Figure 1B:
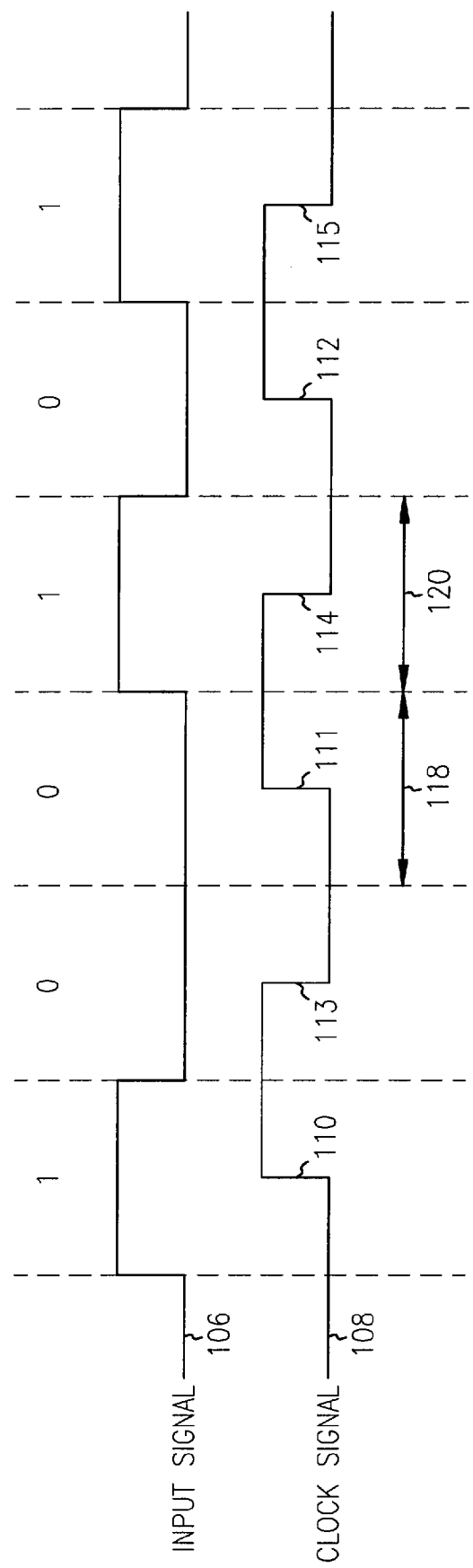
FIG. 1B shows a timing diagram that illustrates the relationship between the INPUT SIGNAL and the CLOCK SIGNAL shown in FIG. 1A.

FIG. 1B shows a timing diagram that illustrates the relationship between the INPUT SIGNAL 106 and the CLOCK SIGNAL 108 shown in FIG. 1A. The INPUT SIGNAL 106, as shown in FIG. 1B, includes the exemplary data pattern 1 0 0 1 0 1. The CLOCK SIGNAL 108, as shown in FIG. 1B, is substantially periodic. However, since the INPUT SIGNAL 106 and the CLOCK SIGNAL 108 are only exemplary signals, the INPUT SIGNAL 106 is not limited to the 1 0 0 1 0 1 data pattern, and the CLOCK SIGNAL 108 is not limited to a substantially periodic signal. As can be seen in FIG. 1B, the CLOCK SIGNAL 108 includes rising clock transitions 110, 111, and 112 and falling clock transitions 113, 114 and 115. Each of the rising clock transitions 110, 111, and 112 and each of the falling clock transitions 113, 114 and 115 defines a bit-cell that occupies about one-half period of the CLOCK SIGNAL 108. For example, the rising clock transition 111 defines a bit-cell 118, which is substantially centered on the rising clock transition 111, and the falling clock transition 114 defines a bit-cell 120, which is substantially centered on the falling clock transition 114. For the exemplary data pattern 1 0 0 1 0 1 shown in FIG. 1B, each of the data values is valid at a transition of the CLOCK SIGNAL 108. For example, an input value zero is valid in the bit-cell 118 at the rising clock transition 111, and an input value one is valid in the bit-cell 120 at the falling clock transition 114. In an alternate embodiment, the input values are valid at only the rising clock transitions 110, 111 and 112. In another alternate embodiment, the input values are valid at only the falling clock transitions 113, 114 and 115.

Referring again to FIG. 1A, the processor unit 102 is an electronic system capable of providing the INPUT SIGNAL 106 and the CLOCK SIGNAL 108 to the input storage unit 104. The processor unit 102 is not limited to a particular type of electronic circuit or system. Any electronic circuit or system capable of providing the INPUT SIGNAL 106 and the CLOCK SIGNAL 108 is suitable for use in connection with the system unit 100. In one embodiment, the processor unit 102 comprises a complex instruction set computer system. In an alternate embodiment, the processor unit 102 comprises a reduced instruction set computer system. In another alternate embodiment, the processor unit 102 comprises a very long instruction word computer system. In still another alternate embodiment, the processor unit 102 comprises a digital signal processor. In still another alternate embodiment, the processor unit 102 comprises a parallel processor. In yet another alternate embodiment, the processor unit 102 comprises an application specific integrated circuit (ASIC), such as an ASIC for controlling an internal combustion engine or an ASIC for controlling a hand-held communication system.

Figure 2A:
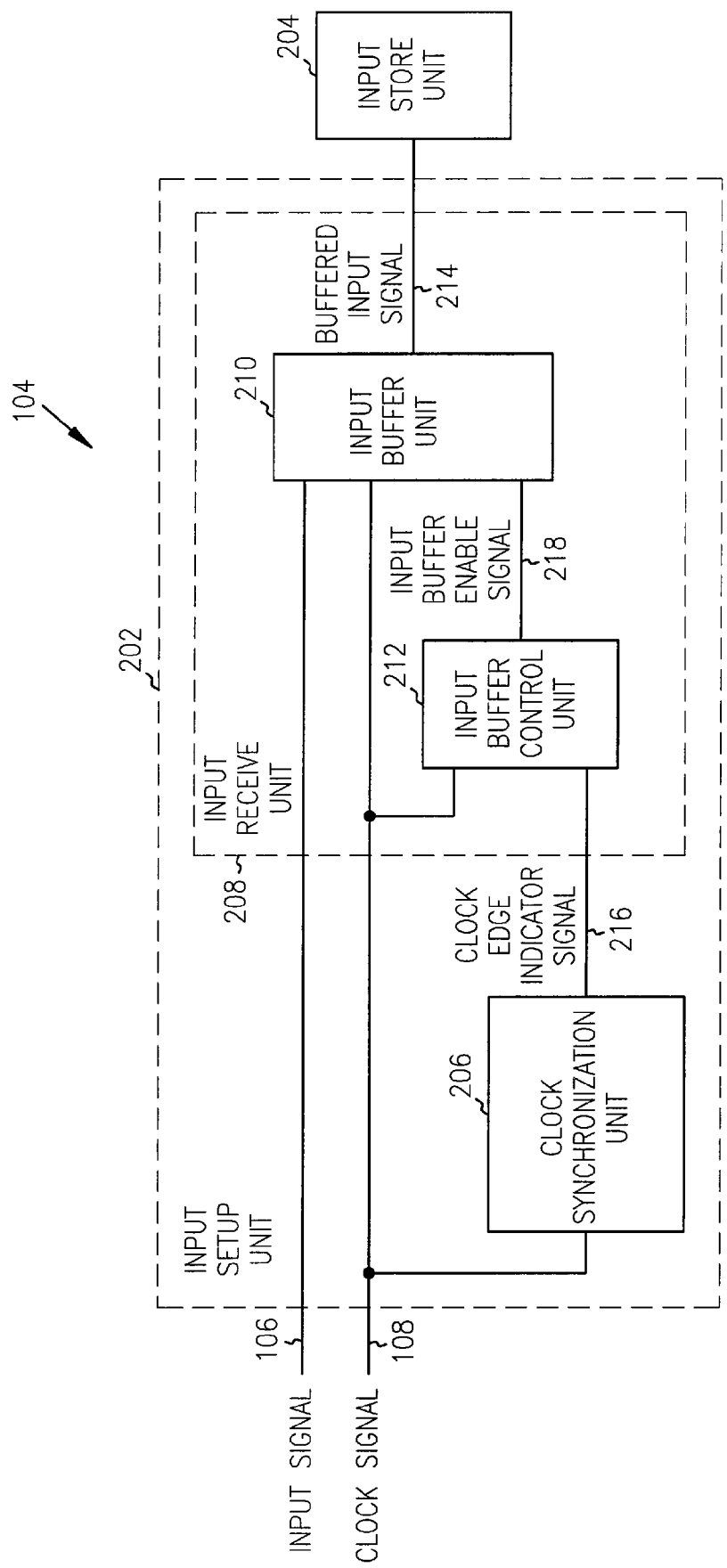
FIG. 2A shows a detailed block diagram of one embodiment of the input storage unit shown in FIG. 1A according to the teachings of the present invention.

FIG. 2A shows a detailed block diagram of one embodiment of the input storage unit 104 (shown in FIG. 1A) according to the teachings of the present invention. The input storage unit 104 includes an input setup unit 202 coupled to an input store unit 204. The input setup unit 202 includes a clock synchronization unit 206 coupled to an input receive unit 208. The input receive unit 208 includes an input buffer unit 210 coupled to an input buffer control unit 212.

The input store unit 204 stores input, however the input store unit 204 is not limited to a particular type of input store unit. In one embodiment, the input store unit 204 is a dynamic random access memory (DRAM). In an alternate embodiment, the input store unit 204 is a synchronous dynamic random access memory (SDRAM). An SDRAM permits synchronization between a processor bus and the memory, which enables faster data transfer than with a DRAM memory alone. In another alternate embodiment, the input store unit 204 is a double-data-rate synchronous dynamic random access memory unit (DDR SDRAM). A DDR SDRAM permits transfer of data on both rising and falling clock edges. In still another alternate embodiment, the input store unit 204 is a double-data-rate-2 synchronous dynamic random access memory unit (DDR2 SDRAM). A DDR2 SDRAM operates at higher data transfer rates than the DDR SDRAM by utilizing a 4-bit prefetch architecture. In yet another alternate embodiment, the input store unit 204 is a Rambus DRAM (RDRAM). An RDRAM is characterized as transferring memory data on a sixteen bit bus at 400 megahertz on both rising and falling system clock edges.

The input buffer unit 210 receives data or information. The input buffer unit 210 is not limited to receiving a particular type of data or information. Exemplary data or information that can be received in the input buffer unit 210 includes clock data and bus data.

In operation, the input setup unit 202 receives the INPUT SIGNAL 106 and the CLOCK SIGNAL 108 from the processor unit 102 (shown in FIG. 1A) and generates and provides a BUFFERED INPUT SIGNAL 214 to the input store unit 204. The clock synchronization unit 206 receives the CLOCK SIGNAL 108 and generates a CLOCK EDGE INDICATOR SIGNAL 216. The input receive unit 208 receives the INPUT SIGNAL 106, the CLOCK SIGNAL 108, and the CLOCK EDGE INDICATOR SIGNAL 216 and generates and provides the BUFFERED INPUT SIGNAL 214 to the input store unit 204. The input buffer control unit 212 receives the CLOCK SIGNAL 108 and the CLOCK EDGE INDICATOR SIGNAL 216 and generates an INPUT BUFFER ENABLE SIGNAL 218. The input buffer unit 210 receives the INPUT SIGNAL 106, the CLOCK SIGNAL 108, and the INPUT BUFFER ENABLE SIGNAL 218 and generates the BUFFERED INPUT SIGNAL 214.

Figure 2B:
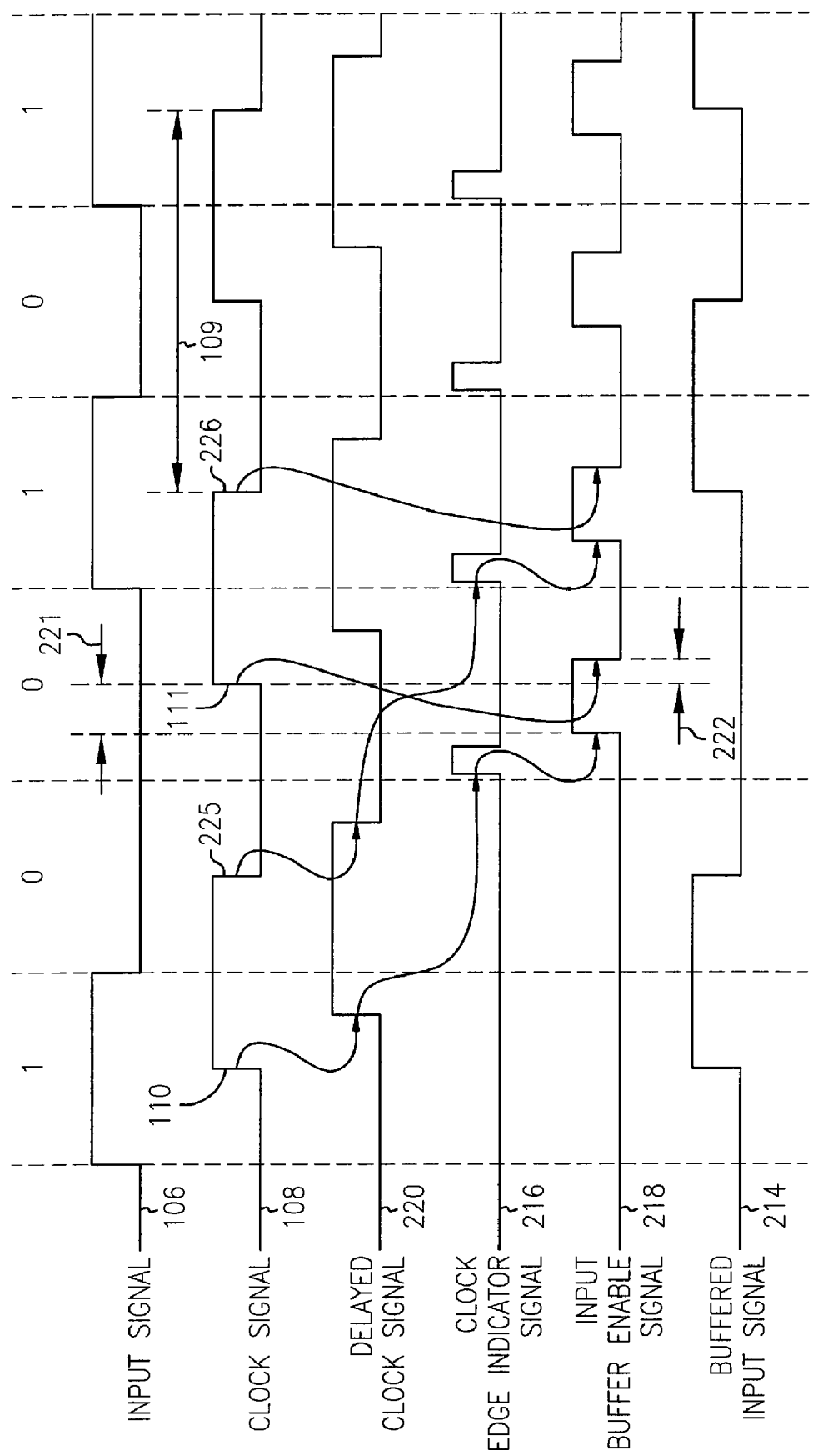
FIG. 2B shows a timing diagram that illustrates one embodiment of the relationship between the CLOCK SIGNAL, the DELAYED CLOCK SIGNAL, the CLOCK EDGE INDICATOR SIGNAL and the INPUT BUFFER ENABLE SIGNAL for the embodiment of the input storage unit shown in FIG. 2A.

FIG. 2B shows a timing diagram that illustrates one embodiment of the relationship between the CLOCK SIGNAL 108, the DELAYED CLOCK SIGNAL 220, the CLOCK EDGE INDICATOR SIGNAL 216 and the INPUT BUFFER ENABLE SIGNAL 218 for the embodiment of the input storage unit shown in FIG. 2A.

To simplify the description of FIG. 2B, the INPUT SIGNAL 106 and the BUFFERED INPUT SIGNAL 214 are illustrated with the exemplary data pattern 1 0 0 1 0 1 used previously in FIG. 1B. However, as noted in the description of FIG. 1B, the system unit 100 is not limited to use in connection with this exemplary input pattern.

The CLOCK SIGNAL 108 is a substantially periodic signal having a period 109. In one embodiment, the rising edges of the CLOCK SIGNAL 108 activate and deactivate the INPUT BUFFER ENABLE SIGNAL 218. For example, for one period of the CLOCK SIGNAL 108, the rising edge 110 activates the DELAYED CLOCK SIGNAL 220 (not shown in FIG. 2A). The DELAYED CLOCK SIGNAL 220 activates the CLOCK EDGE INDICATOR SIGNAL 216. And the CLOCK EDGE INDICATOR SIGNAL 216 activates the INPUT BUFFER ENABLE SIGNAL 218. The rising edge 111 deactivates the INPUT BUFFER ENABLE SIGNAL 218.

In an alternate embodiment, the falling edges of the CLOCK SIGNAL 108 activate and deactivate the INPUT BUFFER ENABLE SIGNAL 218. For example, for one period of the CLOCK SIGNAL 108, the falling edge 225 activates the DELAYED CLOCK SIGNAL 220 (not shown in FIG. 2A). The DELAYED CLOCK SIGNAL 220 activates the CLOCK EDGE INDICATOR SIGNAL 216. And the CLOCK EDGE INDICATOR SIGNAL 216 activates the INPUT BUFFER ENABLE SIGNAL 218. The falling edge 226 deactivates the INPUT BUFFER ENABLE SIGNAL 218.

In another alternate embodiment, the rising edges of the CLOCK SIGNAL 108 and the falling edges of the CLOCK SIGNAL 108 activate and deactivate the INPUT BUFFER ENABLE SIGNAL 218.

As can be seen in FIG. 2B, the INPUT BUFFER ENABLE SIGNAL 218 is activated a short time interval 221 before the rising edge 111 of the CLOCK SIGNAL 108 and is deactivated a short time interval 222 after the rising edge 111. Since the INPUT BUFFER ENABLE SIGNAL 218 activates and deactivates the circuits associated with the input buffer unit 210 (shown in FIG. 2A), limiting the activation of the INPUT BUFFER ENABLE SIGNAL 218 to a short time window that begins slightly before the rising edge 111 and ends slightly after the rising edge 111 limits the activation time of the input buffer unit 210 and thus the power consumption of the input buffer unit 210.

The short time interval 221 and the short time interval 222 are time intervals selected to control the power dissipated in the input buffer unit 210 (shown in FIG. 2A). The duration of the short time interval 221 can be substantially the same or different from the duration of the short time interval 222.

Those skilled in the art will appreciate that the CLOCK SYNCHRONIZATION UNIT 206 (shown in FIG. 2A) can be designed to generate the DELAYED CLOCK SIGNAL 220 (not shown in FIG. 2A) and the CLOCK EDGE INDICATOR SIGNAL 218.

Figure 2C:
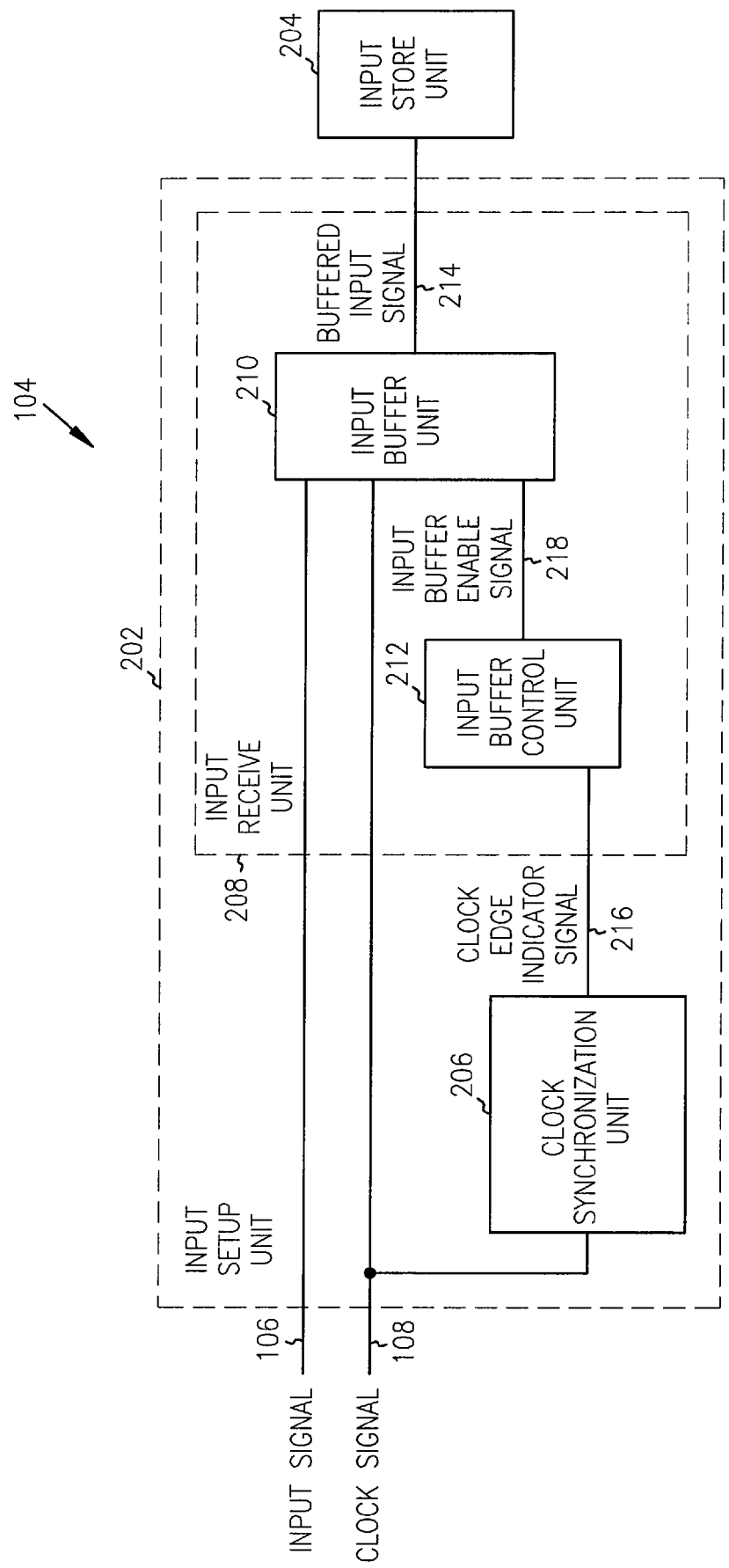
FIG. 2C shows a detailed block diagram of an alternate embodiment of the input storage unit shown in FIG. 1A according to the teachings of the present invention.

FIG. 2C shows a detailed block diagram of an alternate embodiment of the input storage unit 104 shown in FIG. 1A according to the teachings of the present invention. The input storage unit 104 shown in FIG. 2C includes all the elements of the input storage unit 104 shown in FIG. 2A and described above. The difference between the input storage unit 104 shown in FIG. 2C and the input storage unit 104 shown in FIG. 2A is that CLOCK SIGNAL 108 is coupled to the INPUT BUFFER CONTROL UNIT 212 in FIG. 2A and is not coupled to the INPUT BUFFER CONTROL UNIT 212 in FIG. 2C. Thus, the difference in operation between the input storage unit 104 shown in FIG. 2C and the input storage unit 104 shown in FIG. 2A is that the input buffer control unit 212 shown in FIG. 2C generates the INPUT BUFFER ENABLE SIGNAL 218 from the CLOCK EDGE INDICATOR SIGNAL 216 while the input buffer control unit 212 shown in FIG. 2A generates the INPUT BUFFER ENABLE SIGNAL 218 from the CLOCK EDGE INDICATOR SIGNAL 216 and the CLOCK SIGNAL 108.

Figure 2D:
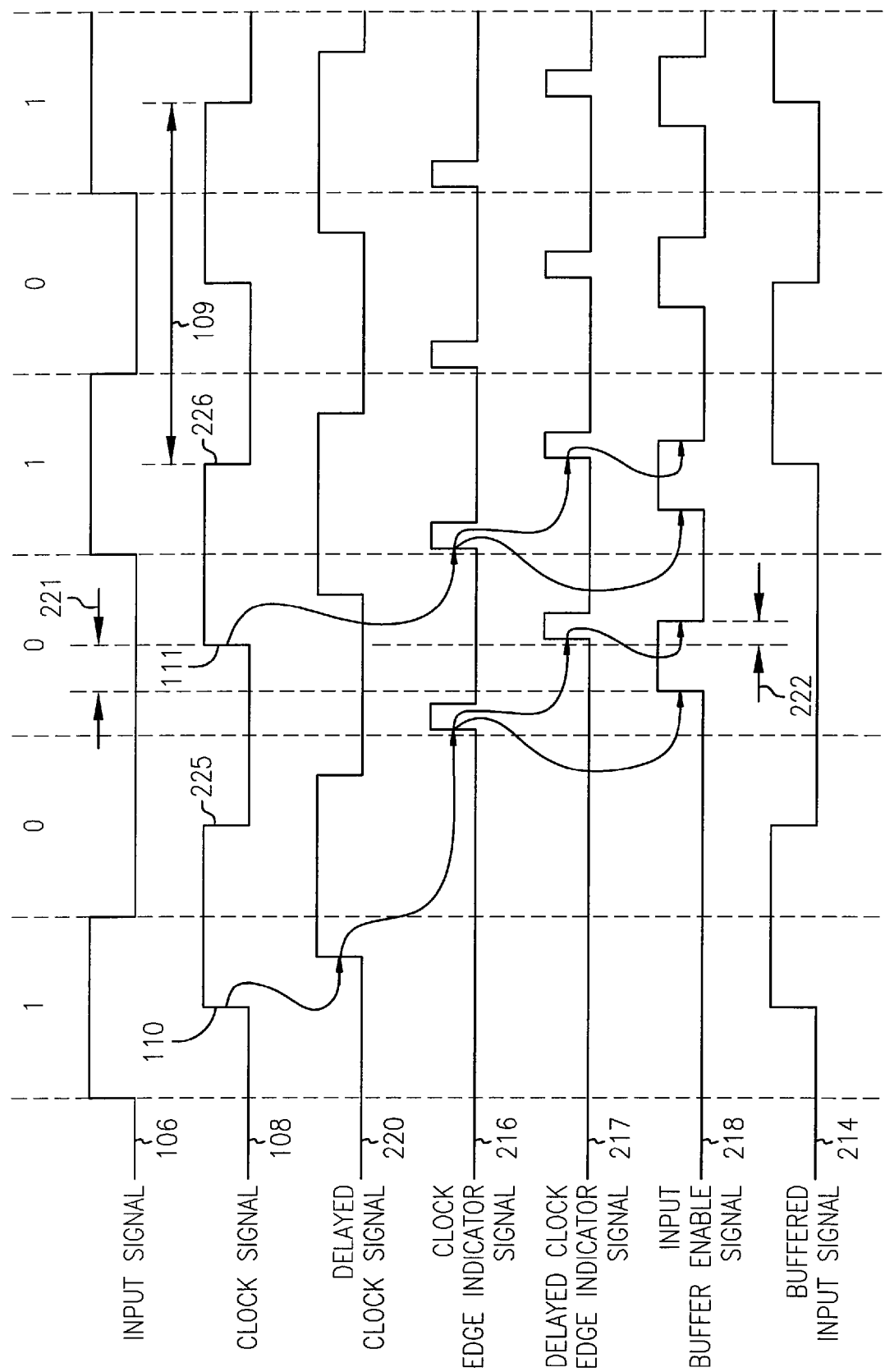
FIG. 2D shows a timing diagram that illustrates one embodiment of the relationship between the CLOCK SIGNAL, the DELAYED CLOCK SIGNAL, the CLOCK EDGE INDICATOR SIGNAL, the DELAYED CLOCK EDGE INDICATOR SIGNAL and the INPUT BUFFER ENABLE SIGNAL for an the embodiment of the input storage unit shown in FIG. 2C.

FIG. 2D shows a timing diagram that illustrates one embodiment of the relationship between the CLOCK SIGNAL 108, the DELAYED CLOCK SIGNAL 220, the CLOCK EDGE INDICATOR SIGNAL 216, the DELAYED CLOCK EDGE INDICATOR SIGNAL 217 and the INPUT BUFFER ENABLE SIGNAL 218 for an the embodiment of the input storage unit 104 shown in FIG. 2C.

The timing diagram shown in FIG. 2D includes a DELAYED CLOCK EDGE INDICATOR SIGNAL 217 in addition to all of the signals shown in FIG. 2B. The DELAYED CLOCK EDGE INDICATOR SIGNAL 217 is a delayed version of the CLOCK EDGE INDICATOR SIGNAL 216. The activation of the INPUT BUFFER ENABLE SIGNAL 218 occurs as shown in FIG. 2B and described above. However, the deactivation of the INPUT BUFFER ENABLE SIGNAL 218 is triggered by the DELAYED CLOCK EDGE INDICATOR SIGNAL 217. Thus, the embodiment of the input storage unit 104 shown in FIG. 2C provides activation and deactivation of the INPUT BUFFER ENABLE SIGNAL 218 by a single rising or falling edge of the CLOCK SIGNAL 108.

As can be see in FIG. 2D, the INPUT BUFFER ENABLE SIGNAL 218 is activated a short time interval 221 before the rising edge 111 of the CLOCK SIGNAL 108 and is deactivated a short time interval 222 after the rising edge 111. Since the INPUT BUFFER ENABLE SIGNAL 218 activates and deactivates the circuits associated with the input buffer unit 210 (shown in FIG. 2A), limiting the activation of the INPUT BUFFER ENABLE SIGNAL 218 to a short time window that begins slightly before the rising edge 111 and ends slightly after the rising edge 111 limits the activation time of the input buffer unit 210 and thus the power consumption of the input buffer unit 210.

Even though FIG. 2D shows the activation and deactivation of the INPUT BUFFER ENABLE SIGNAL 218 on rising edges of the CLOCK SIGNAL 108, those skilled in the art will appreciate that the INPUT BUFFER ENABLE SIGNAL 218 can be activated and deactivated on the rising edges of the CLOCK SIGNAL 108, the falling edges of the CLOCK SIGNAL 108, such as falling edges 225 and 226, or on the rising and falling edges of the CLOCK SIGNAL 108.

Figure 2E:
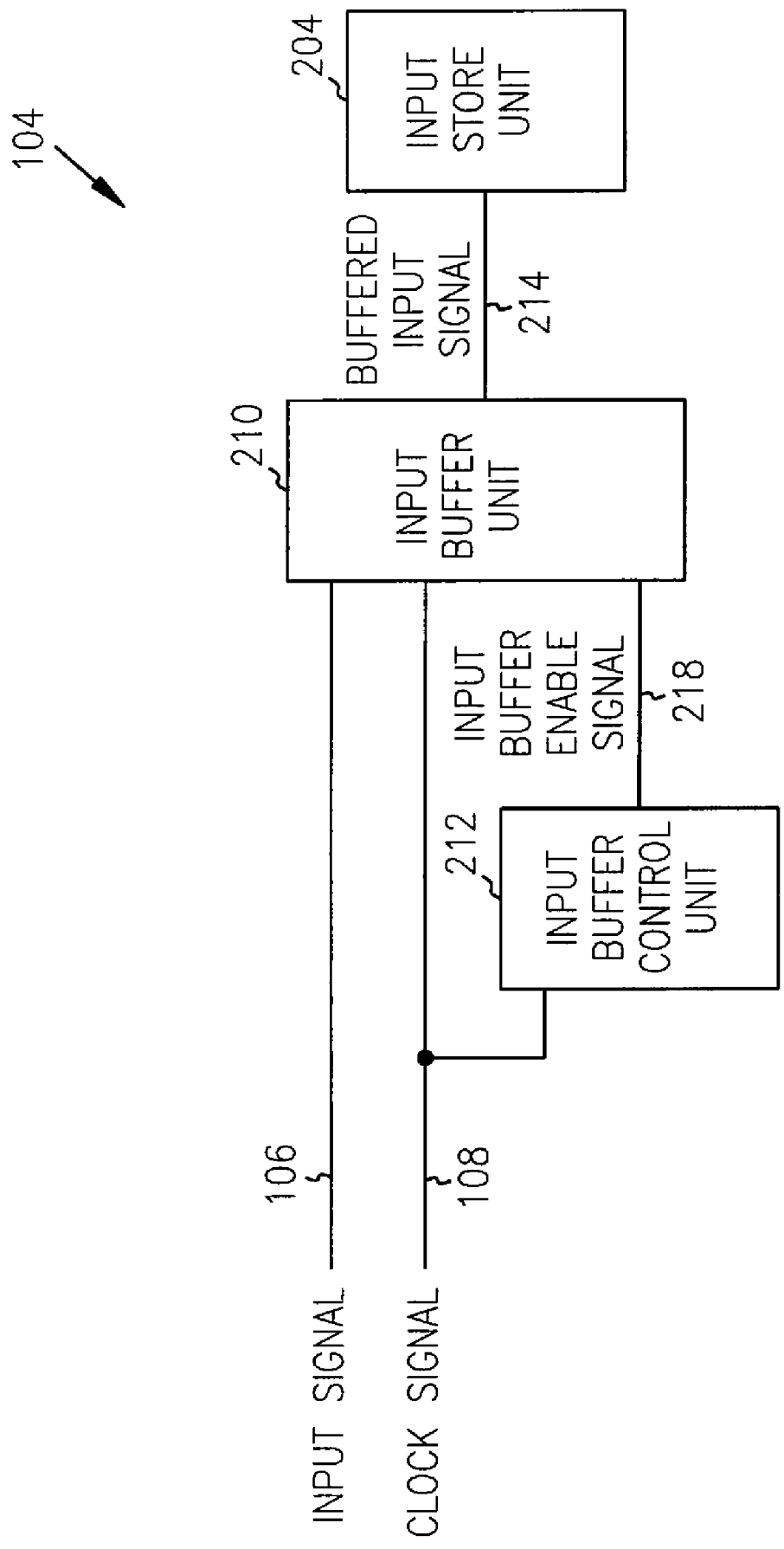
FIG. 2E shows a detailed block diagram of another alternate embodiment of the input storage unit shown in FIG. 1A according to the teachings of the present invention.

FIG. 2E shows a detailed block diagram of another alternate embodiment of the input storage unit 104 (shown in FIG. 1A) according to the teachings of the present invention. The input storage unit 104 includes the input buffer unit 210 coupled to the input store unit 204 and the input buffer control unit 212. The input buffer control unit 212 receives the CLOCK SIGNAL 108. The input buffer unit 210 receives the INPUT SIGNAL 106, the CLOCK SIGNAL 108, and the INPUT BUFFER ENABLE SIGNAL 218 from the input buffer control unit 212. The input store unit 204 receives the BUFFERED INPUT SIGNAL 214 from the input buffer unit 210.

Figure 2F:
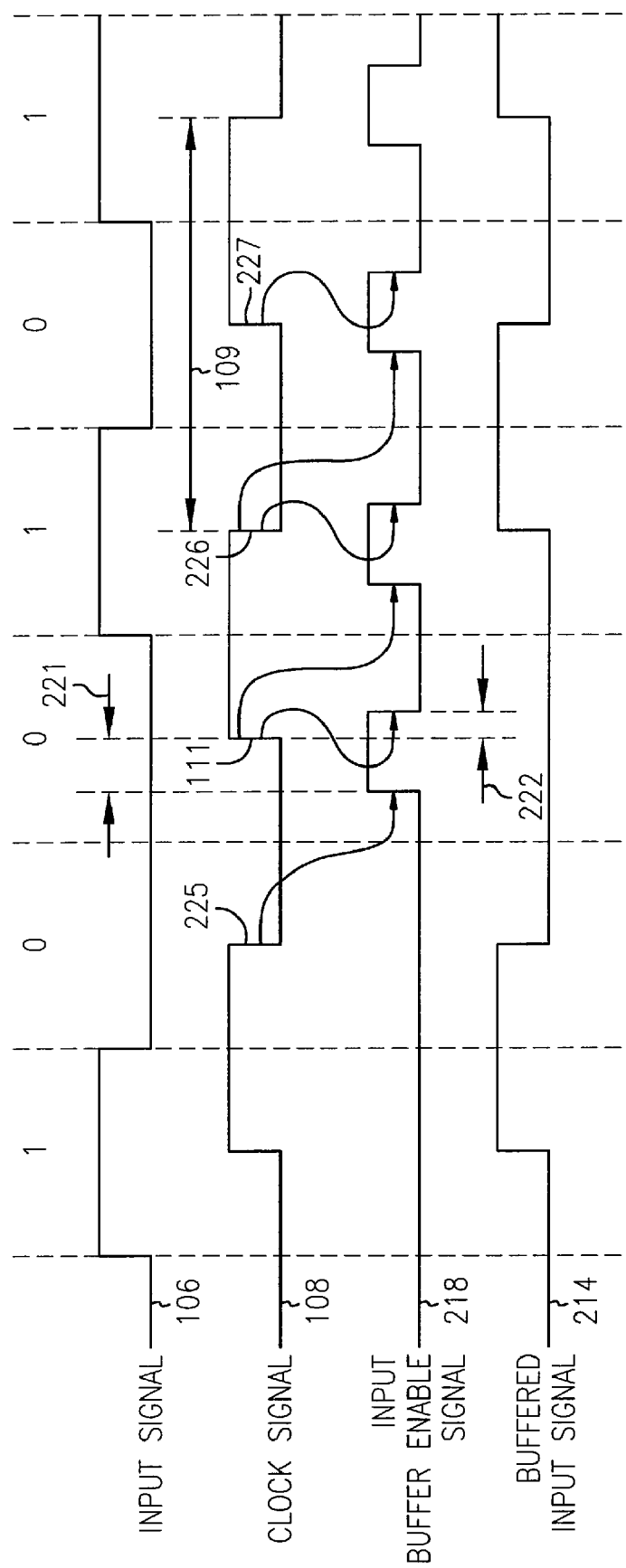
FIG. 2F shows a timing diagram that illustrates one embodiment of the relationship between the CLOCK SIGNAL and the INPUT BUFFER ENABLE SIGNAL for the embodiment of the input storage unit shown in FIG. 2E.

FIG. 2F shows a timing diagram that illustrates one embodiment of the relationship between the CLOCK SIGNAL 108 and the INPUT BUFFER ENABLE SIGNAL 218 for the embodiment of the input storage unit 104 shown in FIG. 2E.

The INPUT SIGNAL 106 and the BUFFERED INPUT SIGNAL 214 are described above with reference to FIG. 2A. The CLOCK SIGNAL 108 includes a rising edge 227, the rising edge 111 and the falling edges 225 and 226. The INPUT BUFFER ENABLE SIGNAL 218 is activated by the falling edge 225, the rising edge 111 and the falling edge 226. The INPUT BUFFER ENABLE SIGNAL 218 is deactivated by the rising edge 111, the falling edge 226 and the rising edge 227. Thus, after the falling edge 225, each successive edge of the CLOCK SIGNAL 108 deactivates and activates the INPUT BUFFER ENABLE SIGNAL 218.

As can be see in FIG. 2F, the INPUT BUFFER ENABLE SIGNAL 218 is activated a short time interval 221 before the rising edge 111 of the CLOCK SIGNAL 108 and is deactivated a short time interval 222 after the rising edge 111. Since the INPUT BUFFER ENABLE SIGNAL 218 activates and deactivates the circuits associated with the input buffer unit 210 (shown in FIG. 2A), limiting the activation of the INPUT BUFFER ENABLE SIGNAL 218 to a short time window that begins slightly before the rising edge 111 and ends slightly after the rising edge 111 limits the activation time of the input buffer unit 210 and thus the power consumption of the input buffer unit 210.

Figure 3A:
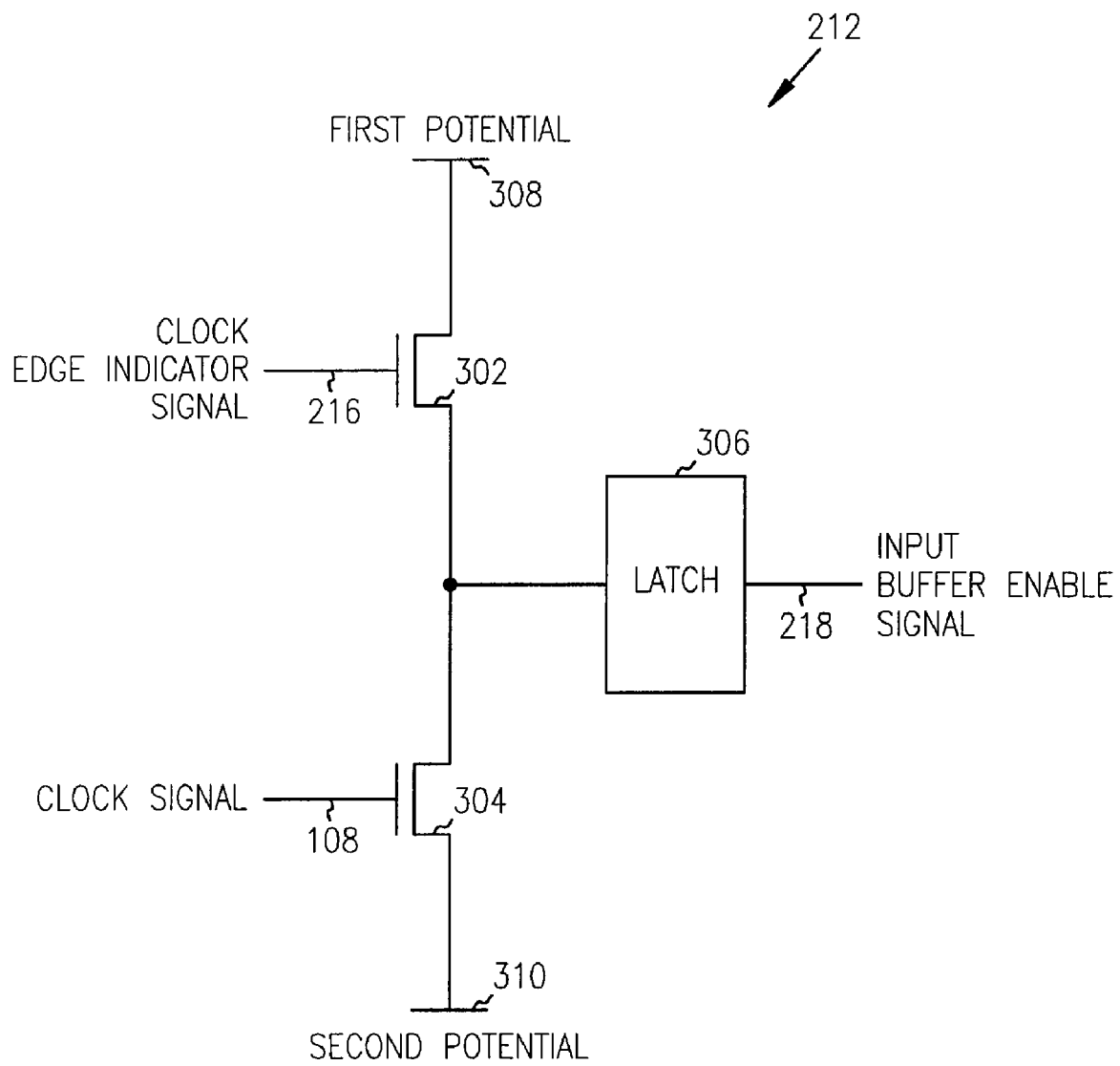
FIG. 3A shows a schematic diagram of one embodiment of the input buffer control unit shown in FIG. 2A according to the teachings of the present invention.

FIG. 3A shows a schematic diagram of one embodiment of the input buffer control unit 212 (shown in FIG. 2A) according to the teachings of the present invention. The input buffer control unit 212 includes transistors 302 and 304 serially connected and coupled to latch 306.

The transistors 302 and 304 are coupled to a first potential 308 and a second potential 310, respectively. The first potential 308 is not equal to the second potential 310, and the first potential 308 and the second potential 310 are not limited to particular potentials. The first potential 308 and the second potential 310 can assume a positive potential or a negative potential. The transistor 302 is also coupled to the CLOCK EDGE INDICATOR SIGNAL 216, and the transistor 304 is coupled to the CLOCK SIGNAL 108. The transistors 302 and 304 are shown as metal-oxide-semiconductor field-effect transistors (MOSFETs), however the input buffer control unit 212 is not limited to use in connection with MOSFETs. Any transistors capable of functioning as switches are suitable for use in connection with the input buffer control unit 212.

In operation, the CLOCK EDGE INDICATOR SIGNAL 216 (also shown in FIGS. 2A and 2B) is a short pulse that activates transistor 302 and sets the latch 306 slightly before an edge of the CLOCK SIGNAL 108 (also shown in FIGS. 2A and 2B). The edge of the CLOCK SIGNAL 108 arriving after the CLOCK EDGE INDICATOR SIGNAL 216 activates transistor 304 and resets the latch 306. Setting the latch 306 activates the INPUT BUFFER ENABLE SIGNAL 218, which enables the input buffer unit 210 (shown in FIG. 2A). Resetting the latch 306 deactivates the input buffer unit 210. Disabling the input buffer unit 210 reduces the power consumed by the input buffer unit 210. Enabling the input buffer unit 210 only slightly before a transition of the CLOCK SIGNAL 108 and disabling the input buffer unit 210 slightly after a transition of the CLOCK SIGNAL 108 reduces the power consumed by the input buffer unit 210.

Figure 3B:
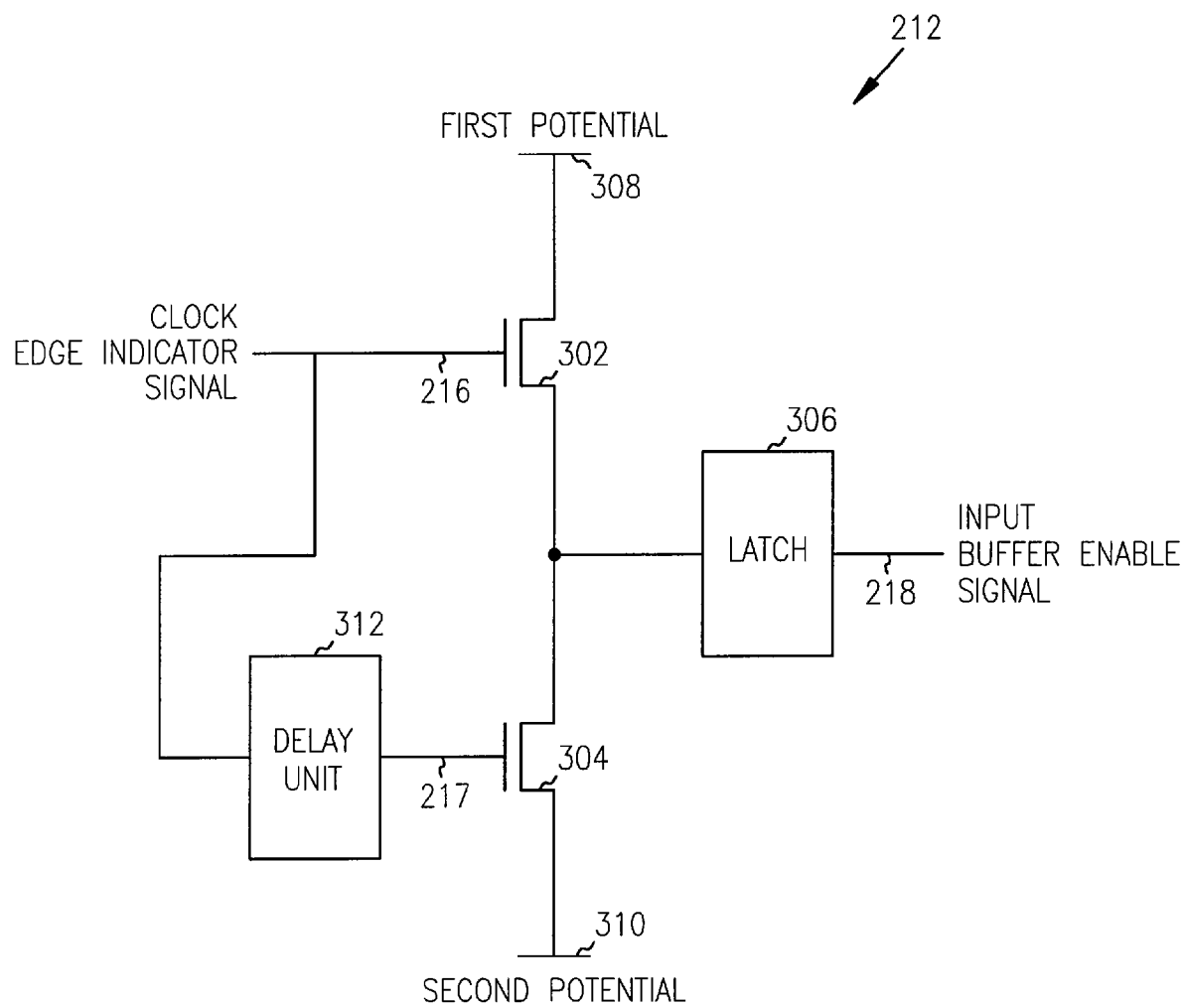
FIG. 3B shows a schematic diagram of an alternate embodiment of the input buffer control unit shown in FIG. 2A according to the teachings of the present invention.

FIG. 3B shows a schematic diagram of an alternate embodiment of the input buffer control unit 212 (shown in FIG. 2A) according to the teachings of the present invention. In addition to the transistors 302 and 304 shown in FIG. 3A and the latch 306 shown in FIG. 3A, the input buffer control unit 212 shown in FIG. 3B includes a delay unit 312. The delay unit 312 receives the CLOCK EDGE INDICATOR SIGNAL 216 and generates a DELAYED CLOCK EDGE INDICATOR SIGNAL 217 that is provided to the transistor 304.

In operation, the CLOCK EDGE INDICATOR SIGNAL 216 (also shown in FIGS. 2A and 2B) is a short pulse that activates the transistor 302 and sets the latch 306 slightly before an edge of the CLOCK SIGNAL 108 (also shown in FIGS. 2A and 2B). The DELAYED CLOCK EDGE INDICATOR SIGNAL 217 activates the transistor 304 and resets the latch 306. Setting the latch 306 activates the INPUT BUFFER ENABLE SIGNAL 218, which enables the input buffer unit 210 (shown in FIG. 2A). Resetting the latch 306 deactivates the input buffer unit 210. Disabling the input buffer unit 210 reduces the power consumed by the input buffer unit 210. Enabling the input buffer unit 210 only slightly before a transition of the CLOCK SIGNAL 108 and disabling the input buffer unit 210 slightly after a transition of the CLOCK SIGNAL 108 reduces the power consumed by the input buffer unit 210.

Figure 4:
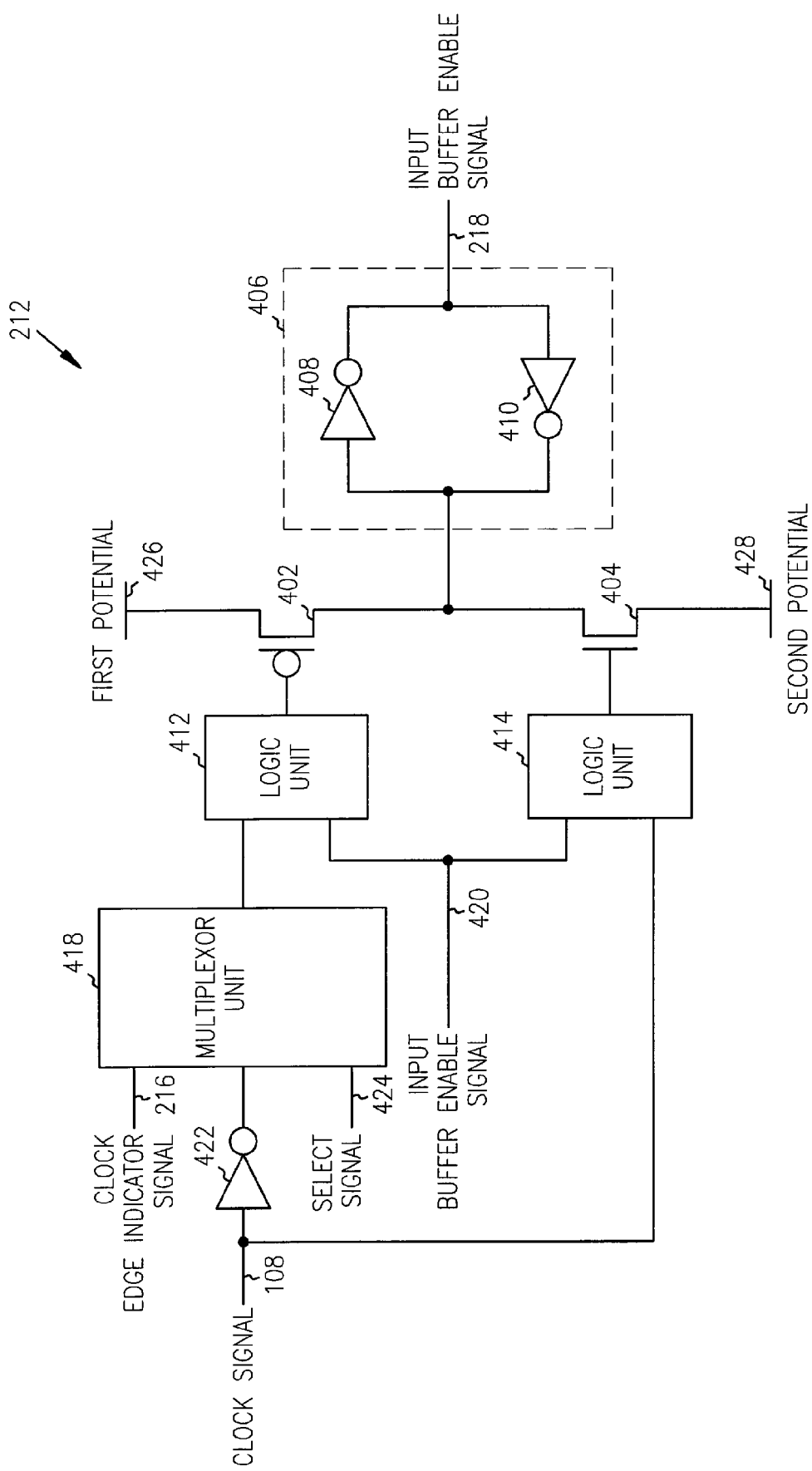
FIG. 4 shows a schematic diagram of another alternate embodiment of the input buffer control unit shown in FIG. 2A according to the teachings of the present invention.

FIG. 4 shows a schematic diagram of an alternate embodiment of the input buffer control unit 212 (shown in FIG. 2A) according to the teachings of the present invention. The input buffer control unit 212 includes transistors 402 and 404 serially connected and coupled to a latch 406. The latch 406 includes inverters 408 and 410 connected in a ring. The transistors 402 and 404 are coupled to logic units 412 and 414, respectively. The logic unit 412 is coupled to the multiplexor 418 and to the BUFFER ENABLE SIGNAL 420. The logic unit 414 is coupled to the BUFFER ENABLE SIGNAL 420 and the CLOCK SIGNAL 108 (shown in FIGS. 2A and 2B). The multiplexor 418 is coupled to the CLOCK EDGE INDICATOR SIGNAL 216 (shown in FIG. 2B), the CLOCK SIGNAL 108 (inverted at the input of the multiplexor unit 418) and a SELECT SIGNAL 424.

The transistors 402 and 404 are coupled to a first potential 426 and a second potential 428, respectively. The first potential 426 is not equal to the second potential 428, and the first potential 426 and the second potential 428 are not limited to particular potentials. The first potential 426 and the second potential 428 can assume a positive potential or a negative potential. The transistors 402 and 404 are shown as metal-oxide-semiconductor field-effect transistors (MOSFETs), but the input buffer control unit 212 is not limited to use in connection with MOSFETs. Any transistors capable of functioning as switches are suitable for use in connection with the input buffer control unit 212.

In operation, the input buffer control unit 212 permits the selection of either of two modes of operation. In the first mode, the buffer control unit 212 operates as shown in FIG. 3. The SELECT SIGNAL 424 (not shown in FIG. 3) gates the CLOCK EDGE INDICATOR SIGNAL 216 to the logic unit 412. The BUFFER ENABLE SIGNAL 420 gates the CLOCK EDGE INDICATOR SIGNAL 216 through the logic unit 412 and the CLOCK SIGNAL 108 through the logic unit 414. The CLOCK EDGE INDICATOR SIGNAL 216 sets the latch 406 and the CLOCK SIGNAL 108 resets the latch 406. When the latch 406 is set, the INPUT BUFFER ENABLE SIGNAL 218 is activated and allows entry of data into the input buffer unit 210 (shown in FIG. 2A). Resetting the latch 406 resets the INPUT BUFFER ENABLE SIGNAL 218 and blocks entry of data into the input buffer unit 210.

In the second mode, the SELECT SIGNAL 424 gates the CLOCK SIGNAL 108 (inverted at the input to the multiplexor 418) through the multiplexor 418 to the logic unit 412. The BUFFER ENABLE SIGNAL 420 gates the CLOCK SIGNAL 108 (inverted at the input to the multiplexor 418) through the logic unit 412. The BUFFER ENABLE SIGNAL 420 also gates the CLOCK SIGNAL 108 through the logic unit 414. So, the CLOCK SIGNAL 108 (through the inverter 422, the multiplexor 418, and the logic unit 412) sets the latch 406, and the CLOCK SIGNAL 108 (through logic unit 414) resets the latch 406. Setting the latch 406 enables the INPUT BUFFER ENABLE SIGNAL 218, which enables the input buffer unit 210 (shown in FIG. 2A). Resetting the latch 406 disables the input buffer unit 210. In this mode, since the CLOCK EDGE INDICATOR SIGNAL 216 is not used, the clock synchronization unit 206 (shown in FIG. 2A) is not necessary.

The INPUT BUFFER ENABLE SIGNAL 218 is a legacy control signal that disables buffers for certain modes of operation such as power down or self-refresh.

Figure 5A:
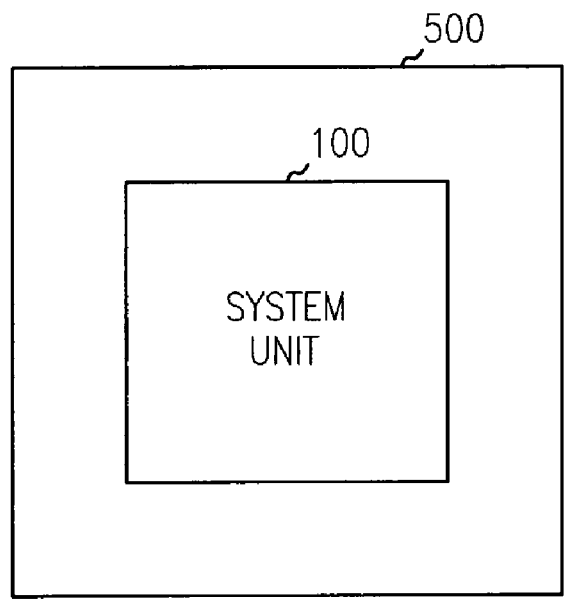
FIG. 5A shows an illustration of one embodiment of the system unit shown in FIG. 1A fabricated on a substrate according to the teachings of the present invention.

FIG. 5A shows an illustration of one embodiment of the system unit 100 (shown in FIG. 1A) fabricated on a substrate 500 according to the teachings of the present invention. Different substrates can be used in the fabrication of the system unit 100, so the system unit 100 is not limited to being fabricated using a particular substrate. In one embodiment, the substrate 500 is a silicon die. In an alternate embodiment, the substrate 500 is a germanium die. In another alternate embodiment, the substrate 500 is a gallium arsenide die. In addition, different processes can be used in the fabrication of the system unit 100, so the system unit 100 is not limited to fabrication using a particular process. In one embodiment, the system unit 100 is fabricated using a complementary metal-oxide-semiconductor (CMOS) process. In an alternate embodiment, the system unit 100 is fabricated using a bipolar process. In still another alternate embodiment, the system unit 100 is fabricated using a mixed bipolar and CMOS process.

Figure 5B:
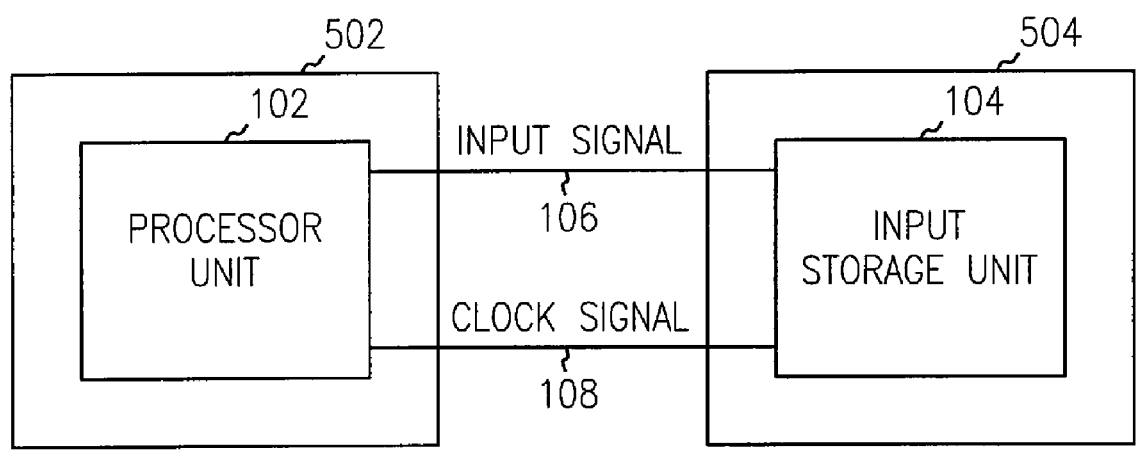
FIG. 5B shows an illustration of one embodiment of the processor unit shown in FIG. 1A formed on a first substrate and the input storage unit shown in FIG. 1A formed on a second substrate according to the teachings of the present invention.

FIG. 5B shows an illustration of an alternate embodiment of the processor unit 102 (shown in FIG. 1A) formed on a first substrate 502 and the input storage unit 104 (shown in FIG. 1A) formed on a second substrate 504 according to the teachings of the present invention. The processor unit 102 and the input storage unit 104 are not limited to being fabricated using a particular substrate material or a particular manufacturing process. In one embodiment, the first substrate 502 is a silicon die and the processor unit 102 is fabricated on the silicon die using a complementary metal-oxide-semiconductor process, and the second substrate 504 is a gallium arsenide die and the input storage unit 104 is fabricated on the gallium arsenide die using a bipolar process. In an alternate embodiment, the first substrate 502 is a germanium die and the processor unit 102 is fabricated on the germanium die using a bipolar process, and the second substrate 504 is a silicon die and the input storage unit 104 is fabricated on the silicon die using a complementary metal-oxide-semiconductor process.

In one embodiment of the invention, a system unit includes a processor unit and an input storage unit coupled to the processor unit. The input storage unit includes a clock synchronization unit and an input receive unit coupled to the clock synchronization unit. The input receive unit includes an input buffer control unit to receive a clock edge indicator signal from the clock synchronization unit. The input buffer unit is coupled to the input buffer control unit and receives an input buffer enable signal from the input buffer control unit and a clock signal having a plurality of rising transitions. The input buffer enable signal only transitions from an inactive state to an active state a short time interval before each of the plurality of rising transitions, and the input buffer unit is enabled only after the input buffer enable signal changes to the active state. An input store unit is coupled to the input buffer unit.

In another embodiment of the invention, a method includes receiving a clock signal having a plurality of transitions at an input buffer unit, enabling the input buffer unit, and disabling the input buffer unit a second time interval after each of the plurality of transitions.

These and other embodiments, aspects, advantages and features of the present invention will be set forth in part in the description, and in part will become apparent to those skilled in the art by reference to the description and referenced drawings or by practice of the invention. The aspects, advantages and features of embodiments of the invention are realized and attained by means of the instrumentalities, procedures and combinations particularly pointed out in the appended claims.

Although specific embodiments have been illustrated and described herein, it will be appreciated by those of skill in the art that any arrangement which is calculated to achieve the same purpose may be substituted for the specific embodiment shown. This application is intended to cover any adaptations or variations of the present invention. Therefore, it is intended that this invention be limited only by the claims and the equivalents thereof.

What is claimed is:

1. A system comprising:
an input storage unit, the input storage unit including at least one input configured to receive information from at least one processor, the input storage unit including at least one input configured to receive a clock signal, the input storage unit configured to provide a buffered input signal, the input storage unit comprising:
an input setup unit, the input setup unit configured to receive information from the processor, the input setup unit configured to receive the clock signal, the input setup unit configured to provide the buffered input signal, the input setup unit comprising:
a clock synchronization unit, the clock synchronization unit configured to receive the clock signal, the clock synchronization unit configured to provide a clock edge indicator signal; and
an input receive unit, the input receive unit configured to receive information from the processor, the input receive unit configured to receive the clock signal, the input receive unit configured to receive the clock edge indicator signal, the input receive unit configured to provide the buffered input signal, the input receive unit comprising:
an input buffer control unit, the input buffer control unit configured to receive the clock signal, the input buffer control unit configured to receive the clock edge indicator signal, the input buffer control unit configured to provide an input buffer enable signal; and
an input buffer unit, the input buffer unit configured to receive information from the processor, the input buffer unit configured to receive the clock signal, the input buffer unit configured to receive the input buffer enable signal, the input buffer unit configured to provide the buffered input signal; and
an input store unit, the input store unit configured to receive the buffered input signal.

2. The system of claim 1, wherein the processor unit comprises at least one of a group consisting essentially of a reduced instruction set computing system, a very long instruction word computing system, a digital signal processor, a parallel processor, and an application specific integrated circuit (ASIC).

3. The system of claim 1, wherein the clock signal includes at least one of an at least one rising transition and an at least one falling transition.

4. The system of claim 3, wherein the clock signal is substantially periodic.

5. The system of claim 1, wherein the input store unit comprises at least one of a group consisting essentially of a dynamic random access memory (DRAM), a synchronous dynamic random access memory (SDRAM), a double-data-rate synchronous dynamic random access memory unit (DDR SDRAM), a double-data-rate-2 synchronous dynamic random access memory unit (DDR2 SDRAM), and a Rambus DRAM (RDRAM).

6. The system of claim 1, wherein the input buffer enable signal is activated and deactivated on at least one of a rising transition of the clock signal and a falling transition of the clock signal.

7. The system of claim 1, wherein the input buffer enable signal is activated and deactivated on at least one of a rising transition and a falling transition of a clock signal and a falling transition and a rising transition of a clock signal.

8. The system of claim 1, wherein the input buffer control unit includes at least one transistor.

9. The system of claim 8, wherein the at least one transistor is coupled to a latch.

10. The system of claim 8, wherein the at least one transistor includes at least one metal-oxide-semiconductor field-effect transistors (MOSFETs).

11. The system of claim 1, wherein the input buffer enable signal is a single signal to the input buffer unit.

12. The system of claim 1, wherein the clock edge indicator signal has a time interval less than the clock signal.

13. A system comprising:
an input storage unit, the input storage unit including at least one input configured to receive information from at least one processor, the input storage unit including at least one input configured to receive a clock signal, the input storage unit configured to provide a buffered input signal, the input storage unit comprising:
an input setup unit, the input setup unit configured to receive information from the processor, the input setup unit configured to receive the clock signal, the input setup unit configured to provide the buffered input signal, the input setup unit comprising:

a clock synchronization unit, the clock synchronization unit configured to receive the clock signal, the clock synchronization unit configured to provide a clock edge indicator signal; and an input receive unit, the input receive unit configured to receive information from the processor, the input receive unit configured to receive the clock signal, the input receive unit configured to receive the clock edge indicator signal, the input receive unit configured to provide the buffered input signal, the input receive unit comprising:

an input buffer control unit, the input buffer control unit configured to receive the clock signal, the input buffer control unit configured to receive the clock edge indicator signal, the input buffer control unit configured to provide an input buffer enable signal; and an input buffer unit, the input buffer unit configured to receive information from the processor, the input buffer unit configured to receive the clock signal, the input buffer unit configured to receive the input buffer enable signal, the input buffer unit configured to provide the buffered input signal; and an input store unit, the input store unit configured to receive the buffered input signal.

14. The system of claim 13, wherein the clock edge indicator signal has a time interval substantially less than the clock signal.

15. The system of claim 13, wherein the clock signal includes at least one rising transition and at least one falling transition.

16. The system of claim 13, wherein the input buffer enable signal is activated on at least one of a rising transition and a falling transition of the clock signal.

17. The system of claim 13, wherein the input buffer enable signal is deactivated on at least one of a rising transition and a falling transition of the clock signal.

18. A system comprising:

an input storage unit, the input storage unit including at least one input configured to receive information from at least one processor, the input storage unit including at least one input configured to receive a clock signal, the input storage unit configured to provide a buffered input signal, the input storage unit comprising:

an input setup unit, the input setup unit configured to receive information from the processor, the input setup unit configured to receive the clock signal, the input setup unit configured to provide the buffered input signal, the input setup unit comprising:

a clock synchronization unit, the clock synchronization unit configured to receive the clock signal, the clock synchronization unit configured to provide a clock edge indicator signal; and an input receive unit, the input receive unit configured to receive information from the processor, the input receive unit configured to receive the clock edge indicator signal, the input receive unit configured to provide the buffered input signal, the input receive unit comprising:

an input buffer control unit, the input buffer control unit configured to receive the clock signal, the input buffer control unit configured to receive the clock edge indicator signal, the input buffer control unit configured to provide an input buffer enable signal; and an input buffer unit, the input buffer unit configured to receive information from the processor, the input buffer unit configured to receive the clock signal, the input buffer unit configured to receive the input buffer enable signal, the input buffer unit configured to provide the buffered input signal; and an input store unit, the input store unit configured to receive the buffered input signal.

19. The system of claim 18, wherein the clock edge indicator signal has a time interval less than the clock signal, wherein the clock signal includes at least one rising transition and at least one falling transition, wherein the input buffer enable signal is activated on at least one of a rising transition and a falling transition of the clock signal.

20. The system of claim 19, wherein the input buffer enable signal is deactivated on at least one of a rising transition and a falling transition of the clock signal.

21. A system comprising:

an input storage unit, the input storage unit including at least one input configured to receive information from at least one processor, the input storage unit including at least one input configured to receive a clock signal, the input storage unit configured to provide a buffered input signal, the input storage unit comprising:

an input setup unit, the input setup unit configured to receive information from the processor, the input setup unit configured to receive the clock signal, the input setup unit configured to provide the buffered input signal, the input setup unit comprising:

a clock synchronization unit, the clock synchronization unit configured to receive the clock signal, the clock synchronization unit configured to provide a clock edge indicator signal; and an input receive unit, the input receive unit configured to receive information from the processor, the input receive unit configured to receive the clock edge indicator signal, the input receive unit configured to provide the buffered input signal, the input receive unit comprising:

an input buffer control unit, the input buffer control unit configured to receive the clock signal, the input buffer control unit configured to receive the clock edge indicator signal, the input buffer control unit configured to provide an input buffer enable signal; and an input buffer unit, the input buffer unit configured to receive information from the processor, the input buffer unit configured to receive the clock signal, the input buffer unit configured to receive the input buffer enable signal, the input buffer unit configured to provide the buffered input signal; and an input store unit, the input store unit configured to receive the buffered input signal.

22. The system of claim 21, wherein the clock edge indicator signal has a time interval less than the clock signal, wherein the clock signal includes at least one rising transition and at least one falling transition, wherein the input buffer enable signal is activated on at least one of a rising transition and a falling transition of the clock signal.

23. The system of claim 22, wherein the input buffer enable signal is deactivated on at least one of a rising transition and a falling transition of the clock signal.

24. A system comprising:
an input storage unit, the input storage unit including at least one input configured to receive information from at least one processor, the input storage unit including at least one input configured to receive a clock signal, the input storage unit comprising:
an input setup unit, the input setup unit configured to receive information from the processor, the input setup unit configured to receive the clock signal, the input setup unit comprising:
a clock synchronization unit, the clock synchronization unit configured to receive the clock signal, the clock synchronization unit configured to provide a clock edge indicator signal;
wherein the input setup unit is configured to provide a buffered input signal,
wherein the buffered input signal consists of information received from the processor, wherein the buffered input signal is enabled using information from the clock edge indicator signal.

25. The system of claim 24, wherein the input storage unit is configured to provide the buffered input signal.

26. The system of claim 24, wherein the input setup unit comprises:
an input receive unit, the input receive unit configured to receive information from the processor, the input receive unit configured to receive the clock signal, the input receive unit configured to receive the clock edge indicator signal, and the input receive unit configured to provide the buffered input signal.

27. The system of claim 24, wherein the input receive unit comprises:
an input buffer control unit, the input buffer control unit configured to receive the clock signal, the input buffer control unit configured to receive the clock edge indicator signal, the input buffer control unit configured to provide an input buffer enable signal;
an input buffer unit, the input buffer unit configured to receive information from the processor, the input buffer unit configured to receive the clock signal, the input buffer unit configured to receive the input buffer enable signal, the input buffer unit configured to provide the buffered input signal.

28. The system of claim 24, wherein the system comprises:
an input store unit, the input store unit configured to receive the buffered input signal.

29. The system of claim 24, wherein the input storage unit comprises:
an input store unit, the input store unit configured to receive the buffered input signal.

30. The system of claim 24, wherein the clock edge indicator signal has a time interval less than the clock signal.

31. The system of claim 24, wherein the processor unit comprises at least one of a group consisting essentially of a complex instruction set computing system, a very long instruction word computing system, a digital signal processor, a parallel processor, and an application specific integrated circuit (ASIC).

32. The system of claim 24, wherein the clock signal includes at least one of an at least one rising transition and an at least one falling transition.

33. The system of claim 32, wherein the clock signal is substantially periodic.

34. The system of claim 24, wherein the input store unit comprises at least one of a group consisting essentially of a dynamic random access memory (DRAM), a synchronous dynamic random access memory (SDRAM), a double-data-rate synchronous dynamic random access memory unit (DDR SDRAM), a double-data-rate-2 synchronous dynamic random access memory unit (DDR2 SDRAM), and a Rambus DRAM (RDRAM).

35. The system of claim 24, wherein the input buffer enable signal is activated and deactivated on at least one of a rising transition of the clock signal and a falling transition of the clock signal.

36. The system of claim 24, wherein the input buffer enable signal is activated and deactivated on at least one of a rising transition and a falling transition of a clock signal and a falling transition and a rising transition of a clock signal.

37. The system of claim 24, wherein the input buffer control unit includes at least one transistor.

38. The system of claim 37, wherein the at least one transistor is coupled to a latch.

39. The system of claim 37, wherein the at least one transistor includes at least one metal-oxide-semiconductor field-effect transistors (MOSFETs).

40. The system of claim 24, wherein the input buffer enable signal is a single signal to the input buffer unit.

41. The system of claim 24, wherein the clock edge indicator signal has a time interval less than the clock signal.

42. A system comprising:
an input buffer unit, including at least one input configured to receive information from at least one processor, and including at least one input configured to receive a clock signal, wherein the clock signal includes at least one transition, the input buffer unit configured to provide a buffered input signal;
means for enabling the input buffer unit before each of the at least one transition of the clock signal; and
means for disabling the input buffer unit after each of the at least one transition of the clock signal.

43. A system comprising:
an input buffer unit, including at least one input configured to receive information from at least one processor, and including at least one input configured to receive a clock signal, wherein the clock signal includes at least one rising transition, the input buffer unit configured to provide a buffered input signal;
means for enabling the input buffer unit before each of the at least one rising transition of the clock signal; and
means for disabling the input buffer unit after each of the at least one rising transition of the clock signal.

44. A system comprising:
an input buffer unit, including at least one input configured to receive information from at least one processor, and including at least one input configured to receive a clock signal, wherein the clock signal includes at least one falling transition, the input buffer unit configured to provide a buffered input signal;
means for enabling the input buffer unit before each of the at least one falling transition of the clock signal; and
means for disabling the input buffer unit after each of the at least one falling transition of the clock signal.

45. A method comprising:
receiving a clock signal having a plurality of transitions at an input buffer unit;
enabling the input buffer unit before each of the plurality of transitions in response to at least a clock edge indicator signal; and
disabling the input buffer unit after each of the plurality of transitions.

46. A method comprising:
receiving a clock signal having a plurality of transitions at an input buffer unit;

enabling the input buffer unit in an input storage unit before each of the plurality of transitions in response to at least a clock edge indicator signal; and disabling the input buffer unit after each of the plurality of transitions.

47. A method comprising:

receiving a clock signal having a plurality of falling transitions at an input buffer unit;

enabling the input buffer unit in an input storage unit before each of the plurality of falling transitions in response to at least a clock edge indicator signal; and disabling the input buffer unit after each of the plurality of falling transitions.

48. A method comprising:

receiving a clock signal having a plurality of falling transitions at an input buffer unit;

enabling the input buffer unit in a double-data-rate synchronous dynamic random access memory unit before each of the plurality of falling transitions in response to at least a clock edge indicator signal; and disabling the input buffer unit after each of the plurality of falling transitions.

49. A method comprising:

receiving a clock signal at a clock synchronization unit and at an input buffer unit, the clock signal having a plurality of falling transitions;

processing a clock edge indicator signal in a memory unit to activate an input buffer enable signal before each of the plurality of falling transitions; and processing the clock edge indicator signal to deactivate the input buffer enable signal after each of the plurality of falling transitions.

\* \* \* \* \*